United States Patent
Hoecker et al.

(10) Patent No.: US 8,257,027 B2
(45) Date of Patent: Sep. 4, 2012

(54) EXHAUST-DRIVEN TURBOCHARGER FOR A MOTOR VEHICLE

(75) Inventors: Patric Hoecker, Landau (DE); Florian Rentz, Benningen A. N. (DE)

(73) Assignee: Bosch Mahle Turbo Systems GmbH & Co. KG. (DE)

( * ) Notice: Subject to any disclaimer, the term of this patent is extended or adjusted under 35 U.S.C. 154(b) by 614 days.

(21) Appl. No.: 12/486,292

(22) Filed: Jun. 17, 2009

(65) Prior Publication Data

US 2009/0317247 A1 Dec. 24, 2009

(30) Foreign Application Priority Data

Jun. 19, 2008 (DE) .......................... 10 2008 029 080

(51) Int. Cl.
*F01D 25/24* (2006.01)
*F03B 11/02* (2006.01)
*F04D 29/40* (2006.01)
*F03D 5/00* (2006.01)
*F03D 11/00* (2006.01)

(52) U.S. Cl. ................... 415/126; 415/209.3; 415/214.1
(58) Field of Classification Search .................. 415/126, 415/128, 127, 203, 205, 206, 209.3, 214.1, 415/159–166
See application file for complete search history.

(56) References Cited

U.S. PATENT DOCUMENTS

2006/0062663 A1* 3/2006 Figura et al. .................. 415/160
2007/0130943 A1* 6/2007 Sausse et al. .................. 60/602
* cited by examiner

*Primary Examiner* — Edward Look
*Assistant Examiner* — Su Htay
(74) *Attorney, Agent, or Firm* — Rader, Fishman & Grauer PLLC

(57) ABSTRACT

An exhaust-driven turbocharger for a motor vehicle may include a bearing housing and a turbine housing, which are mounted in the bearing house by means of a common shaft. A guide vane cage surrounds the turbine wheel. The guide vane cage may have at least two arms. The arms may be used to help secure the guide vane cage between the bearing housing and the turbine housing such that it can move in the radial direction.

20 Claims, 3 Drawing Sheets

EXHAUST-DRIVEN TURBOCHARGER FOR A MOTOR VEHICLE

CROSS-REFERENCES TO RELATED APPLICATION

Figure 1:
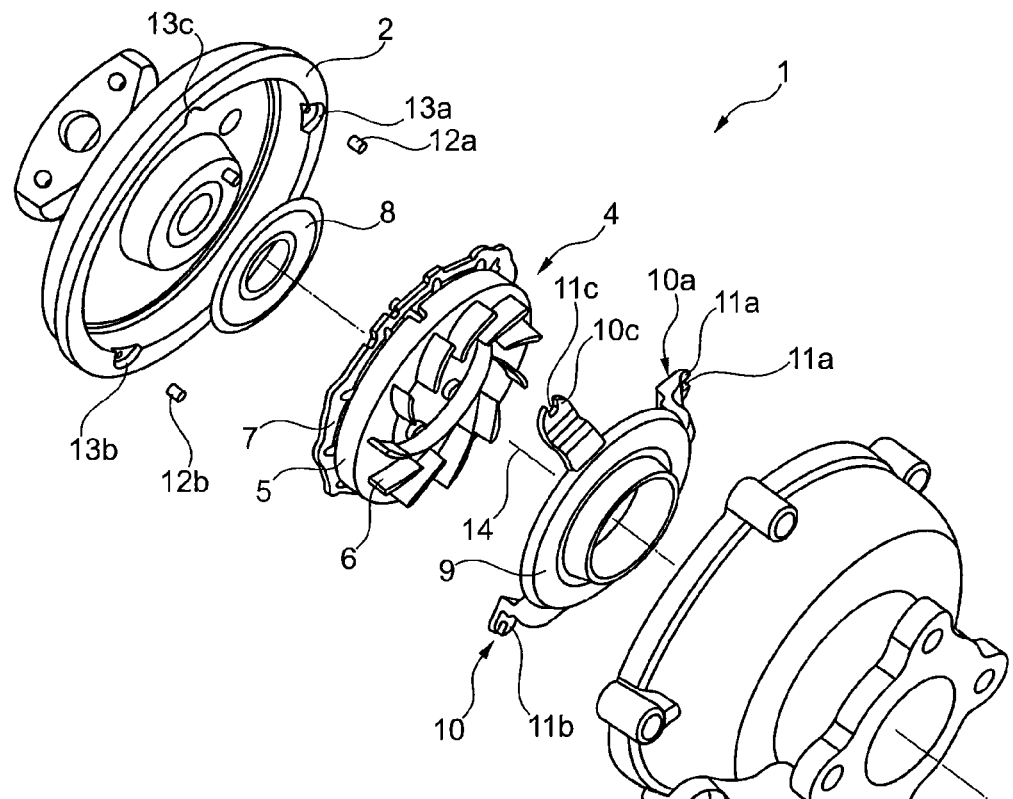

This application claims priority to German patent application DE 10 2008 029 080.7 filed on Jun. 19, 2008, which is hereby incorporated by reference in its entirety.

The present invention relates to an exhaust-driven turbocharger for a motor vehicle according to the preamble of claim 1. The invention furthermore relates to an internal combustion engine which is fitted with such an exhaust-driven turbocharger and a motor vehicle which is fitted with such an internal combustion engine.

A generic exhaust-driven turbocharger is known for example from WO 2004/022926 A1, in which a housing of the exhaust-driven turbocharger and its adjustable, variable turbine and/or compressor geometry are decoupled mechanically and/or thermally from each other. Thermally induced expansions in particular are intended to be better accommodated by this. A cartridge is screw-fastened to a bearing housing and has an axial gap towards the turbine housing for thermal decoupling.

Generally, all the components of an exhaust-driven turbocharger are usually subject to severe temperature fluctuations during operation and, owing to the use of different materials and different geometries, expansions of different severities, so that these components, as long as they are connected in a fixed manner to each other, can be under great thermal stresses, which in the least favourable case can lead to failure of the actual function or to destruction of the component. The guide vane cage is there for the purpose of forming as small and homogenous a gap as possible to a turbine wheel of the charging device, wherein the gap must be large enough so that wobbling movements of a rotor, which is composed of the turbine wheel and a shaft, as well as manufacturing and assembly tolerances are possible without contact between the turbine wheel and the guide vane cage occurring.

The present invention is concerned with the problem of specifying an improved embodiment for an exhaust-driven turbocharger of the generic type, with which embodiment temperature loads in particular can be better accommodated.

This problem is solved according to the invention by the subject matter of the independent claims. Advantageous embodiments form the subject matter of the dependent claims.

The invention is based on the general idea of mounting a guide vane cage inside an exhaust-driven turbocharger in such a manner that it can expand in a low-stress, preferably even stress-free manner at all temperatures which arise during operation of the exhaust-driven turbocharger. Owing to its direct position in the hot gas of the exhaust-driven turbocharger, the guide vane cage is usually heated very greatly, wherein the guide vane cage should be prevented from expanding on one side and thus reducing a defined gap which is provided between it and a turbine wheel in an uncontrolled manner. Contact between the turbine wheel and the guide vane cage and thus damage to the turbine wheel or guide vane cage owing to impeded temperature expansions should in particular be prevented from occurring. According to the invention, the guide vane cage therefore has at least two arms, preferably three arms, by means of which it is clamped between a bearing housing and a turbine housing of the exhaust-driven turbocharger in such a manner that it can only move in the radial direction. This means that the guide vane cage is fixed in the axial direction on one side by the turbine housing and on the other side by the bearing housing, and against turning in the circumferential direction. The degree of radial freedom of the arms of the guide vane cage allows a uniform radial expansion of the latter during heating and a radial shrinkage during cooling, with the degree of radial freedom always ensuring that a gap which is to be provided between the guide vane cage and the turbine wheel remains at the predefined size. The degree of radial freedom of the guide vane cage in particular produces a low assembly tolerance chain with which for example the gap between the turbine wheel and the guide vanes can be reduced and thus the efficiency on the turbine side of the exhaust-driven turbocharger can be increased. At the same time virtually all thermomechanical stresses in the guide vane cage can be eliminated, as a result of which the service life of the latter can be increased on one hand and materials with lower strength can be used on the other hand. The latter effect is reflected in particular in a cost reduction. Of course, it is also conceivable that the principle according to the invention of the degree of radial freedom of the guide vane cage can be transferred easily to other exhaust-driven turbocharger series.

In an advantageous embodiment of the solution according to the invention, the guide vane cage has three arms, between which an angle of approx. 120° is provided in each case. This means that a statically precise system can be created in a similar manner to a three-legged stool, which allows a particularly reliable bearing of the guide vane cage. Of course, four arms are also conceivable, wherein however a statically over-precise system is produced, which is more difficult to handle compared to a guide vane cage with only three arms.

In a further advantageous embodiment of the solution according to the invention, a radial guide is provided on each of the arms of the guide vane cage and a guide pin, which is associated in each case and guided in the guide on the arm side, is provided on the bearing housing, or vice versa. The radial guide can for example be configured as a slot which is open radially outwards or closed and in which a guide pin on the bearing housing side engages. The interaction between the guide pin on the bearing housing side on the one hand and the guide on the arm side on the other hand allows an unimpeded expansion of the guide vane cage in the radial direction, but at the same time allows the guide vane cage to be fixed against turning about its axis. Of course other types of bearing are generally also conceivable, with all of them having in common that they in each case give the guide vane cage a degree of radial freedom while fixing it in the circumferential and axial directions.

The guide vane cage is expediently configured as a single-piece sheet metal part. This makes it possible to fabricate the guide vane cage together with its arms in a common punching or forming process, as a result of which the guide vane cage per se can be fabricated in an extremely cost-effective manner.

Further important features and advantages of the invention can be found in the subclaims, the drawings and the associated description of the figures using the drawings.

It is self-evident that the features which are mentioned above and those which are still to be explained below can be used not only in the combination specified in each case, but also in other combinations or alone without departing from the framework of the present invention.

Preferred exemplary embodiments of the invention are shown in the drawings and are explained in more detail in the following description, with the same reference symbols referring to the same or similar or functionally identical components.

Figure 2:
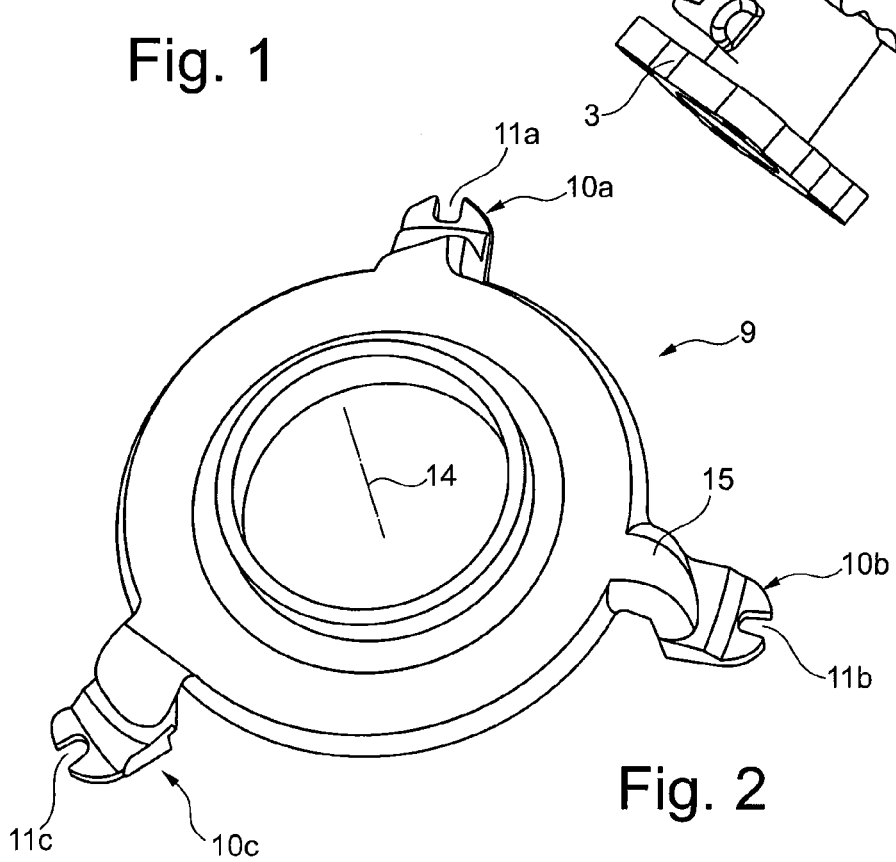
Figure 3:
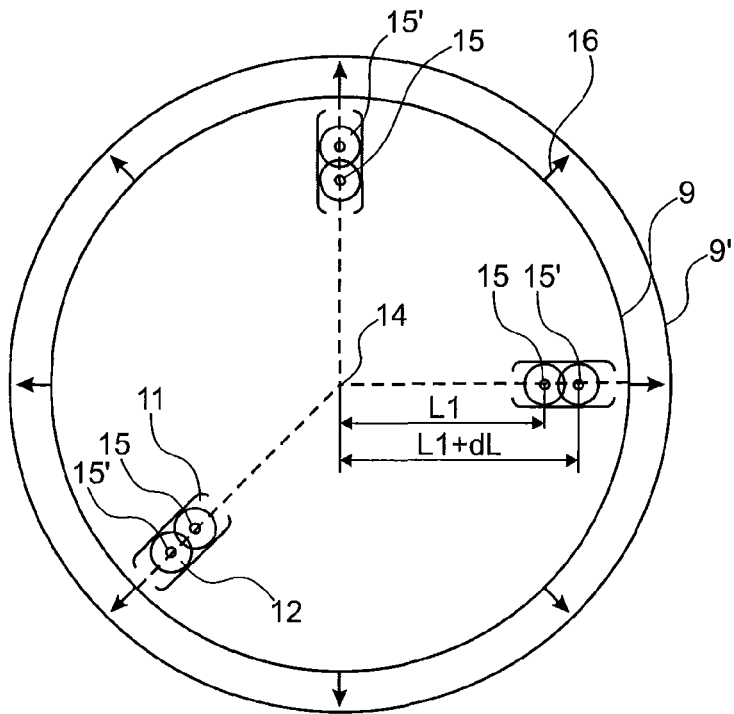
Figure 4:
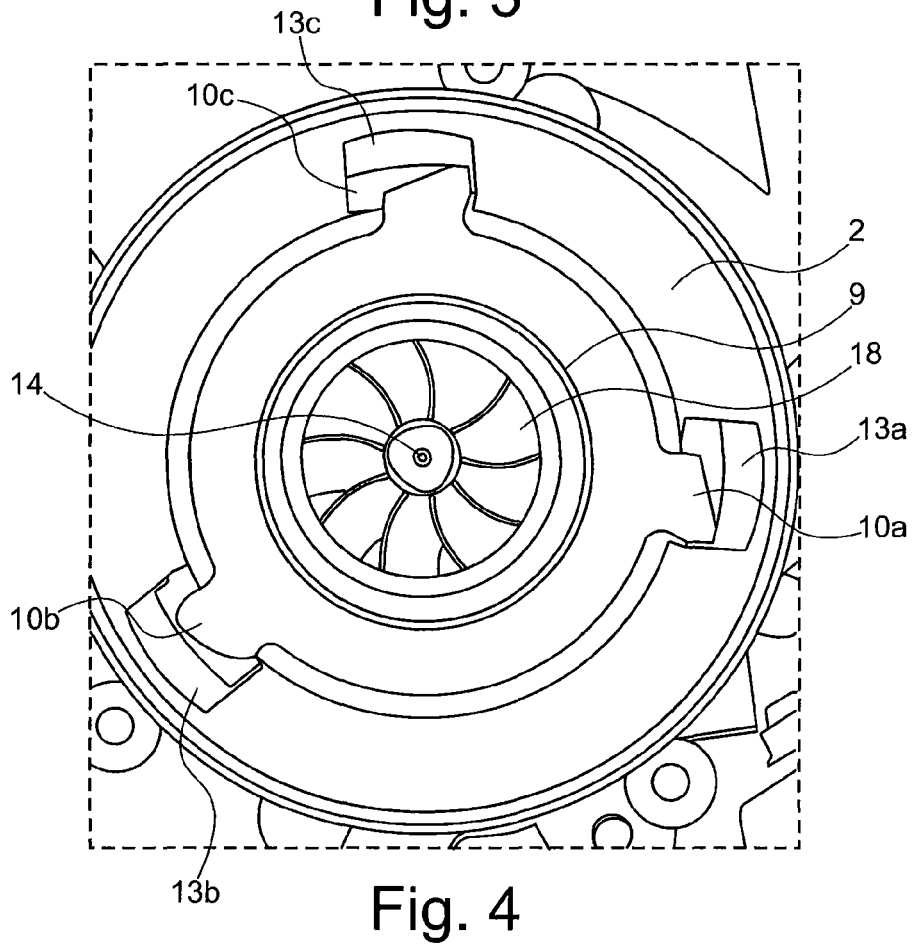
Figure 5:
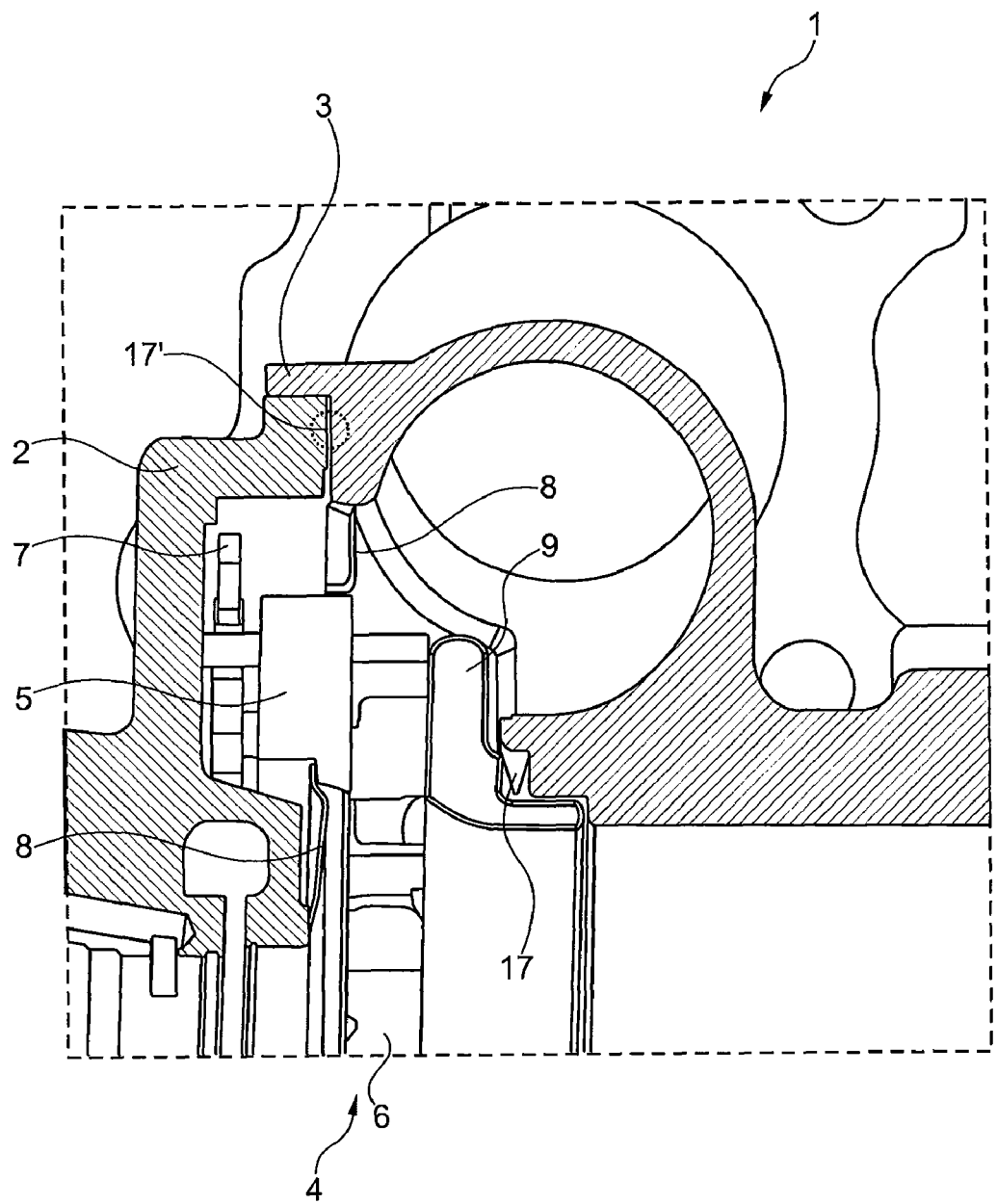

In the figures,

FIG. 1 shows an exploded diagram of an exhaust-driven turbocharger with a guide vane cage according to the invention, FIG. 2 shows a detailed diagram of a guide vane cage according to FIG. 1, FIG. 3 shows a possible expansion of the guide vane cage, FIG. 4 shows a guide vane cage in the installed state, but with different adjustment mechanics compared to FIG. 1 to 3, FIG. 5 shows a sectional diagram through the exhaust-driven turbocharger in the region of the guide vane cage.

According to FIG. 1, an exhaust-driven turbocharger 1 has a bearing housing 2 and a turbine housing 3 in which a turbine wheel 18 (cf. FIG. 4) rotates. A variable turbine geometry 4 with a guide vane support 5 and guide vanes 6 which are arranged rotatably therein can furthermore be provided between the bearing housing 2 and the turbine housing 3. The guide vanes 6 are adjusted by means of an adjusting ring 7. A heat shield 8 can furthermore be arranged between the variable turbine geometry 4 and the bearing housing 2, while a guide vane cage 9 is arranged between the guide vane support 5, the guide vanes 6 and the turbine housing 3. The guide vane cage 9, together with the variable turbine geometry 4, is exposed to the hot exhaust gas flow and is thus subject to considerable temperature influences. The function of the guide vane cage 9 usually consists in forming as small and homogenous a gap as possible towards the turbine wheel 18. This gap must be big enough for wobbling movements of the rotor (turbine wheel and shaft), manufacturing and assembly tolerances to be possible without contact occurring between the turbine wheel 18 and the guide vane cage 9. A rotational axis 14 of the rotor is predefined by the bearing housing 2. In order furthermore to be able to minimise the number of assembly tolerances, it is necessary for the guide vane cage 9, for its position to be likewise predefined directly by the bearing housing 2.

In order to be able to keep the thermal stresses between the individual components as low as possible, an unimpeded thermal expansion of the guide vane cage 9 is in particular necessary. The latter will heat up very greatly and quickly owing to its direct contact with the hot gas, as a result of which it may expand in the radial direction in as uniform a manner as possible. If the guide vane cage according to FIGS. 1 and 2 is viewed, it can be seen that it has three arms 10a, 10b and 10c, by means of which it is clamped in a fixed manner in the axial direction between the bearing housing 2 and the turbine housing 3. In contrast it is possible for the arms 10 to move in the radial direction. In general, the guide vane cage 9 should have at least two arms 10, which are then for example mutually opposite, wherein three arms 10a, 10b and 10c are preferably provided owing to the static precision, between which there is in each case an angle of approx. 120°.

The radial mobility, that is, the degree of freedom in the radial direction, is made possible for example by guides 11a, 11b and 11c, which are arranged in each case on the arms 10a, 10b and 10c and are configured in particular as slots which are closed in the radial direction or outwardly open. The guides 11 interact for example with guide pins 12a, 12b and 12c which are fixed to the bearing housing 2 and engage in the guides 11a, 11b and 11c on the arm side. It is also of course conceivable, instead of the guides 11 or the guide pins 12 on the bearing housing side, for the arms 10a, 10b and 10c to be accommodated in guide recesses 13a, 13b and 13c on the bearing housing side, which only allow guiding or movement in the radial direction, but prevent movement in the axial direction or in the circumferential direction of the guide vane cage 9 (cf. in particular FIG. 4).

If FIG. 3 is viewed, an expansion, which is shown in a highly exaggerated manner, of the guide vane cage 9 can be seen in the heated state compared to the cold state, wherein the measure L1 describes a distance from a rotational axis 14 to an elevation 15. In contrast, the measure L1+dL describes the distance of the rotational axis 14 from the elevation 15', wherein the reference symbol 15' refers to the elevation 15 in a greatly heated state. The guide vane cage 9 expands in the radial direction 16 from its cold state 9 to its heated state 9'.

In general, the guide vane cage 9 can be configured as a single-part sheet metal part and thus allow in particular a simple and therefore cost-effective fabrication process, or else the arms 10 of the guide vane cage 9 are for example configured as separate components. A seal 17, in particular of the metallic folding seal type, is furthermore arranged between the guide vane cage 9 and the turbine housing 3, in order to prevent undesired bypass flows of hot gas. Of course, a further seal 17' can also be arranged between the turbine housing 3 and the bearing housing 2 in order to prevent hot gas from flowing away in an undesired manner.

With the guide vane cage 9 according to the invention, an expansion thereof which is uniform in the radial direction and thus rotationally symmetrical is possible owing to the heating thereof during operation of the exhaust-driven turbocharger 1, as a result of which in particular contact between the guide vane cage 9 and a turbine wheel 18 can effectively be prevented and thus damage avoided, and furthermore a gap which is present between the turbine housing 3 and the turbine wheel 18 can be kept small, which has a positive effect on the efficiency of the exhaust-driven turbocharger 1. According to the invention, the guide vane cage 9 thus has a degree of freedom in the radial direction while being fixed in the axial direction and in the circumferential direction. Fixing in the axial direction takes place by clamping the guide vane cage between the bearing housing 2 on one side and the turbine housing 3 on the other side, while fixing of the guide vane cage 9 in the circumferential direction is effected for example by the guides 11 or a guide recess 13. The possibility of radial expansion means that temperature stresses can also be minimised or completely prevented, as a result of which on one hand a material with a lower strength could be used and/or the service life of the guide vane cage 9 per se can be prolonged. An exhaust-driven turbocharger 1 which is equipped with such a guide vane cage 9 can for example be a component of an internal combustion engine which is used in a motor vehicle.

List of Reference Symbols

1 Exhaust-driven turbocharger
2 Bearing housing
3 Turbine housing
4 Variable turbine geometry
5 Guide vane support
6 Guide vane
7 Adjusting ring
8 Heat shield
9 Guide vane cage
10 Arm
11 Guide
12 Guide pin
13 Guide recess
14 Axis of rotation
Elevation
16 Radial direction
17 Seal
18 Turbine wheel

The invention claimed is:

1. An exhaust-driven turbocharger for a motor vehicle, comprising,
   a bearing housing and a turbine housing,
   a turbine wheel and a compressor wheel, which are mounted in the bearing housing,
   a guide vane cage, which surrounds the turbine wheel with a defined gap, and
   at least two arms included with the guide vane cage, wherein the guide vane cage is clamped between the bearing housing and the turbine housing such that the guide vane cage only moves in a radial direction.

2. The exhaust-driven turbocharger according to claim 1, wherein the guide vane cage has three arms between which an angle of approximately 120° is provided.

3. The exhaust-driven turbocharger according to claim 2, wherein a radial guide is provided on each of the arms and a guide pin, which is associated in each arm and guided in the radial guide on an arm side, is provided on the bearing housing.

4. The exhaust-driven turbocharger according to claim 1, wherein the bearing housing has a guide recess for each of the arms of the guide vane cage.

5. The exhaust-driven turbocharger according to claim 1, wherein one of the following is selected:
   i. the guide vane cage is configured as a single-part sheet metal part, and
   ii. the arms of the guide vane cage are configured as separate components.

6. The exhaust-driven turbocharger according to claim 1, wherein a seal is arranged between the guide vane cage and the turbine housing.

7. The exhaust-driven turbocharger according to claim 6, wherein the seal is not exposed directly to a hot gas flow.

8. The exhaust-driven turbocharger according to claim 1, wherein the exhaust-driven turbocharger has a guide vane support, wherein the guide vane support is pre-stressed by means of the guide vane cage and the turbine housing against a mating surface.

9. The exhaust-driven turbocharger according to claim 1, wherein the exhaust-driven turbocharger is used in an internal combustion engine.

10. The exhaust-driven turbocharger according to claim 9, wherein the internal combustion engine is used in a motor vehicle.

11. The exhaust-driven turbocharger according to claim 2, wherein a radial guide is provided on each of the arms and a guide pin, which is associated in each arm and guided in the guide on an arm side, is provided on the guide vane cage.

12. The exhaust-driven turbocharger according to claim 6, wherein the seal is a metallic folding seal.

13. The exhaust-driven turbocharger according to claim 2, wherein the bearing housing has a guide recess for each of the arms of the guide vane cage.

14. The exhaust-driven turbocharger according to claim 2, wherein one of the following is selected:
   i. the guide vane cage is configured as a single-part sheet metal part, and
   ii. the arms of the guide vane cage are configured as separate components.

15. The exhaust-driven turbocharger according to claim 2, wherein a seal is arranged between the guide vane cage and the turbine housing.

16. The exhaust-driven turbocharger according to claim 15, wherein the seal is not exposed directly to a hot gas flow.

17. The exhaust-driven turbocharger according to claim 2, wherein the exhaust-driven turbocharger has a guide vane support, wherein the guide vane support is pre-stressed by means of the guide vane cage and the turbine housing against a mating surface.

18. The exhaust-driven turbocharger according to claim 3, wherein one of the following is selected:
   i. the guide vane cage is configured as a single-part sheet metal part, and
   ii. the arms of the guide vane cage are configured as separate components.

19. The exhaust-driven turbocharger according to claim 3, wherein a seal is arranged between the guide vane cage and the turbine housing.

20. The exhaust-driven turbocharger according to claim 19, wherein the seal is not exposed directly to a hot gas flow.

* * * * *